United States Patent
Mutnuru (10) Patent No.: US 11,297,131 B2
(45) Date of Patent: Apr. 5, 2022

(54) METHOD AND APPARATUS FOR MULTI-VENDOR GTM FABRIC

(71) Applicant: Oracle International Corporation, Redwood Shores, CA (US)

(72) Inventor: Rishi Mutnuru, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/709,820

(22) Filed: Dec. 10, 2019

(65) Prior Publication Data

US 2021/0176301 A1 Jun. 10, 2021

(51) Int. Cl.
| | | |
|---|---|---|
| *H04L 29/08* | (2006.01) | |
| *H04L 67/101* | (2022.01) | |
| *H04L 43/0864* | (2022.01) | |
| *H04L 101/69* | (2022.01) | |
| *H04L 61/4511* | (2022.01) | |
| *H04L 43/10* | (2022.01) | |

(52) U.S. Cl.
CPC ........ *H04L 67/101* (2013.01); *H04L 43/0864* (2013.01); *H04L 43/10* (2013.01); *H04L 61/1511* (2013.01); *H04L 61/609* (2013.01)

(58) Field of Classification Search
CPC ... H04L 67/101; H04L 43/0864; H04L 43/10; H04L 61/1511; H04L 61/609
See application file for complete search history.

(56) References Cited

U.S. PATENT DOCUMENTS

| | | | | |
|---|---|---|---|---|
| 6,795,860 B1 * | 9/2004 | Shah | ................ | H04L 29/12066 709/229 |
| 7,584,301 B1 * | 9/2009 | Joshi | ................... | H04L 67/1002 709/244 |
| 7,653,700 B1 * | 1/2010 | Bahl | ................... | H04L 67/1038 709/217 |
| 7,941,556 B2 * | 5/2011 | Canali | ................ | H04L 67/1008 709/238 |
| 7,991,879 B2 * | 8/2011 | Josefsberg | .......... | H04L 67/1002 709/224 |
| 8,326,980 B2 * | 12/2012 | Huang | .............. | H04L 29/12066 709/224 |

(Continued)

OTHER PUBLICATIONS

Huang; Cheng et al.; A DNS Reflection Method for Global Traffic Management http://research.microsoft.com/en-us/um/people/chengh/papers/dns-reflection10.pdf; 6 pages.

*Primary Examiner* — Blake J Rubin
(74) *Attorney, Agent, or Firm* — Trellis IP Law Group, PC (57) ABSTRACT

An example method facilitates Global Traffic Management (GTM) and associated selective distribution of computing loads and/or network traffic among different geographically distributed data centers of a particular domain by allocating the servicing of request messages from Local Domain Name Servers (LDNSs) to data centers that are estimated to provide the quickest response times to the LDNSs. Estimates of path latencies or Round Trip Times (RTTs) between the LDNSs and the different distributed data centers are estimated using DNS reflection methodologies and are maintained in a database that may be accessed and collectively managed via the data centers, e.g., via use of a web service that fronts the database. Locations of the LDNSs approximate locations of client devices seeking access to the domain.

20 Claims, 6 Drawing Sheets

(56) References Cited

U.S. PATENT DOCUMENTS

| | | | |
|---|---|---|---|
| 8,504,721 B2* | 8/2013 | Hsu | H04L 67/1008 709/245 |
| 8,549,148 B2* | 10/2013 | Devarapalli | H04L 67/1002 709/226 |
| 9,923,959 B2* | 3/2018 | Flavel | H04L 61/1511 |
| 10,193,852 B2* | 1/2019 | Kommula | H04L 29/12066 |
| 2001/0049741 A1* | 12/2001 | Skene | H04L 45/00 709/232 |
| 2002/0052942 A1* | 5/2002 | Swildens | H04L 67/06 709/223 |
| 2011/0153723 A1* | 6/2011 | Mutnuru | H04L 61/1511 709/203 |
| 2011/0270964 A1 | 11/2011 | Huang | |
| 2012/0066360 A1* | 3/2012 | Ghosh | H04L 43/0864 709/223 |
| 2012/0179814 A1* | 7/2012 | Swildens | H04L 67/1002 709/224 |
| 2014/0258536 A1* | 9/2014 | Chiong | H04L 47/125 709/226 |
| 2014/0304412 A1* | 10/2014 | Prakash | H04L 61/1511 709/226 |
| 2015/0095494 A1* | 4/2015 | Lin | H04L 67/1036 709/225 |
| 2015/0098333 A1* | 4/2015 | Lin | H04L 67/101 370/235 |
| 2015/0281104 A1* | 10/2015 | Golshan | H04L 47/125 370/238 |
| 2015/0381447 A1* | 12/2015 | Huang | H04L 69/40 709/224 |
| 2016/0080262 A1* | 3/2016 | Crasta | H04L 61/6009 709/238 |
| 2016/0226708 A1* | 8/2016 | Maheshwari | H04L 67/10 |
| 2017/0085486 A1* | 3/2017 | Chung | H04L 61/6022 |
| 2018/0097696 A1* | 4/2018 | Calo | H04L 41/5009 |
| 2018/0227311 A1* | 8/2018 | Hippelainen | H04W 4/02 |
| 2018/0278571 A1* | 9/2018 | Gal | H04L 61/1511 |
| 2019/0230462 A1* | 7/2019 | McLarty | H04W 4/02 |
| 2019/0238450 A1* | 8/2019 | Michael | H04L 43/0864 |
| 2019/0306111 A1* | 10/2019 | Tang | H04L 61/1552 |
| 2020/0228495 A1* | 7/2020 | Ogale | H04L 43/16 |
| 2020/0295998 A1* | 9/2020 | Ranjbar | H04L 41/0816 |
| 2020/0296026 A1* | 9/2020 | Michael | H04L 43/08 |
| 2020/0366592 A1* | 11/2020 | Ehrat | H04L 45/26 |

* cited by examiner

METHOD AND APPARATUS FOR MULTI-VENDOR GTM FABRIC

CROSS REFERENCES TO RELATED APPLICATIONS

This application is related to the following application, U.S. patent application Ser. No. 16/709,826, entitled METHOD AND APPARATUS FOR ACCURATE GLB ACHIEVED BY USING DISTRIBUTED DNS REFLECTION filed on Dec. 10, 2019, which is hereby incorporated by reference as if set forth in full in this application for all purposes.

BACKGROUND

The present application relates to computing, and more specifically to systems and methods for facilitating Global Traffic Management (GTM), whereby network traffic is selectively distributed among data centers of a particular domain.

Systems and methods for selectively distributing traffic and sharing computing resources used by a given domain or website are employed in various demanding applications, including the distribution of traffic among data centers hosting cloud services, e.g., cloud-based enterprise applications, search functionality, mobile applications, and so on, via Application Delivery Networks (ADNs), Content Delivery Networks (CDNs), and so on. Such applications often demand efficient distribution of traffic and loads among participating nodes of the associated networks, which may be widely distributed across the globe.

Such GTM network traffic-distribution systems and methods can be particularly important when distributing or balancing network traffic (and data-center message processing loads) between different geographically distributed servers and associated Data Centers (DCs) (e.g., rooms or buildings housing plural servers, i.e., a server system) of a particular domain. Generally, the data centers process requests for data and/or functionality issued by client devices that communicate with servers of the domain, where the servers are grouped into different data centers.

Generally, GTM may involve determining which data center of a particular domain should service a client request for data and/or functionality sent to a particular domain. For example, a client device (e.g., desktop computer running a browser, a mobile device running mobile apps, and so on) may issue a request addressed to a particular domain (e.g., www.example.com). The client device may be located, for instance, in India, and data centers handling service requests for the domain may be distributed within the United States, across the world, or otherwise geographically distributed.

More specifically, GTM may involve determining which of the distributed data centers of the domain should service the request from the client device in, for instance, India. This may involve using estimates of network latency between the client device in India and each geographically distributed data center. The data center associated with the lowest estimate of network latency between the client device and the data center may be chosen as the data center to handle the request from the client device.

Conventionally, estimates of network latencies (e.g., identified by Round Trip Times (RTTs) for network links) are based on passive and/or active techniques. An example passive technique involves using geographic location information (also called proximity metrics) of the data centers and client devices, whereby data centers that are closest to client devices are used to service requests for those client devices. However, such techniques are often suboptimal and do not account for dynamically changing network conditions, such as changes in network topology, network congestion, computing loads at the different data centers, and so on.

An example active technique involves issuing probes or queries to estimate network latencies. Probing techniques may involve use of data center Application Delivery Controllers (ADCs) to issue pings or queries to other servers (e.g., Local Domain Name Servers (LDNSs)), and then measuring response times, so as to estimate network latencies that are then used to select data centers to service particular request messages. However, excessive use of the probing may not only increase network congestion, but many data centers and servers may be configured to not respond to such pings or queries, such that the pings or queries are dropped. Accordingly, the probing may only work to estimate network latencies for a small subset of data centers servicing a given network or domain. Accordingly, GTM (also called Global Load Balancing (GLB) herein) based merely on conventional passive and/or active methods alone can be problematically inaccurate.

Furthermore, conventional active and passive techniques for determining the network latencies for the purposes of GTM may require that ADCs of the data centers servicing a particular domain incorporate technologies that are compatible with other ADCs (e.g., ADCs provided by the same vender) of other data centers servicing the same domain. This problematic restriction can further inhibit efficient and accurate GTM using the conventional methods.

SUMMARY

An example method facilitates Global Traffic Management (GTM) and associated selective distribution of network traffic and associated loads among different geographically distributed data centers of a particular domain by allocating the servicing of request messages from Local Domain Name Servers (LDNSs) (communicating with local client devices) to data centers that are estimated to provide the quickest response times to the LDNSs, based on estimates of path latencies or Round Trip Times (RTTs) between the LDNSs and the different distributed data centers. Locations of the LDNSs approximate locations of client devices seeking access to the domain (such as the domain "www.example.com").

Estimates of response times and other GTM metrics may include use of technology-independent DNS reflection methods in combination with a shared database or repository (shared among the data centers) of the estimates of the RTTs. Application Delivery Controllers (ADCs) at each data center may access and selectively update the shared database, and may use information therein to facilitate making optimal traffic routing and message handling decisions. The ADCs at the different data centers need not be of the same type or from the same vendor, as various embodiments discussed herein can be readily implemented for domains using various different types of ADCs to front-end their data centers.

Accordingly, an example method for facilitating GTM includes estimating a first RTT between a first data center and an LDNS and estimating a second RTT between a second data center (that may service the same domain as the first data center) and the LDNS using a message-reflection method, resulting in estimation of a first RTT value and a second RTT value, respectively; storing the first RTT value and the second RTT value in a database that is accessible to the first data center and the second data center, resulting in stored latency information; receiving a first request message from the LDNS at the first data center or the second data center; determining, based on the stored latency information, whether the first RTT or the second RTT is smaller; and selecting the first data center or the second data center to process the request message based on whether or not the first RTT or the second RTT is smaller, respectively.

In a more specific embodiment, the example method further includes using a web service or Application Programming Interface (API) to facilitate providing the first and second data centers shared (and authenticated) access to and use of the database. The first request message from the LDNS specifies a CNAME (Canonical Name) of a domain name. The domain name, i.e., the primary domain name (e.g., www.example.com) is originally specified by a client device in communication with the LDNS.

The LDNS sends the first request message to the first data center or the second data center after a query specifying the domain name from the client device and after retrieval of the CNAME by the LDNS. Retrieval of the CNAME by the LDNS may include first accessing an Internet root DNS to identify another Top-level DNS server (TDNS) (e.g., a TDNS server for ".com" domain names), and then using the TDNS server to obtain the CNAME for use in constructing the first request message to be sent to the first or second data center.

The step of estimating may further include determining whether or not one or more of the first RTT value or the second RTT value (as measured using the message reflection method), preexist(s) in the database, and then initializing the database with one or more first RTT estimates (called estimates as opposed to values to differentiate from those measured or estimated using reflection methods) obtained using a passive method (e.g., based on geographical proximity) and/or an active method (e.g., based on pings and/or queries) when the database has not yet been populated with the first RTT value or the second RTT value.

The passive method may include providing the one or more first RTT estimates based on location information pertaining to the first data center, the second data center, and the LDNS. The active method may include selectively probing the LDNS using one or more pings or queries to obtain the second RTT estimates. The first RTT value (as opposed to estimate) and the second RTT value referenced above represent third RTT estimates, which are obtained using the message-reflection method, as opposed to other passive and/or active methods used for initialization of one or more of the RTTs in the shared database.

In the specific example embodiment, the first data center includes a first ADC. The second data center includes a second ADC. The first ADC communicates with a first reflector DNS server (also simply called a DNS reflector herein) and a first collector DNS server (also simply called a DNS collector) that are co-located in the same data center as the first ADC; wherein the second ADC communicates with a second reflector DNS server and a second collector DNS server that are co-located in the same data center as the second ADC. The first message includes or represents a DNS request message.

In the specific example embodiment, message-reflection method may include determining, for instance, the first RTT value at the first data center by: receiving, at the first reflector DNS server the first request message; augmenting the first request message with a first time stamp and an Internet Protocol (IP) address of the first collector DNS server (that is co-located at the same data center as the first reflector DNS server), resulting in an adjusted first message; sending the adjusted first message to the LDNS, whereby the adjusted first message represents a first reflected request message; receiving at the first collector DNS server a first return message from the LDNS in response to the receipt of the first reflected request that is reflected to the first collector via the LDNS and first reflector DNS server; comparing the first time stamp with a time at which the first collector DNS server receives the first return message; and estimating the first RTT based on the comparing of the time stamp with the message-receipt time at the first collector DNS server.

Accordingly, certain embodiments discussed herein employ an algorithm that selects a preferred data center for servicing a request message (also simply called a request herein) based on a selective combination of static (i.e., passive), active, and DNS reflection techniques, where method implementation is substantially independent of ADC type. A cloud service may store and selectively provide RTT times and associated metrics between the different distributed data centers and different LDNSs of different regions, where the web service may be readily accessed using preexisting ADC technologies offered by various vendors.

ADCs fronting each data center may initialize the database of RTT metrics using static proximity data (e.g., which can be obtained from existing vendors) and/or active methods (e.g., using pings and/or queries, as discussed more fully below). Use of DNS reflection methods discussed herein may enable implementation of embodiments to work seamlessly with heterogeneous and multi-vendor technologies deployed at different data centers that may serve a given domain.

The collected RTT metrics may be periodically downloaded by data center ADCs, and also periodically updated thereby. RTT metrics in the shared database may periodically expire and then be updated again as needed (to meet the needs of a given implementation), so as to account for dynamically changing properties of the network of distributed data centers and various LDNSs communicating therewith.

Use of a cloud service to facilitate data-center access to the database of RTT metrics (also called the GTM latency metrics database and accompanying RTT table) helps to ensure that preexisting ADC technologies can readily obtain the latest accurate RTT metrics so as to facilitate optimal GTM or Global Load Balancing (GLB) decision making.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on. Enterprise computing environments are often networked computing environments.

A networked computing environment may be any computing environment that includes intercommunicating computers, i.e., a computer network. Similarly, a networked software application may be any software application (e.g., a mobile app, desktop browser plugin, etc.) that communicates with one or more computing resources via a computer network.

A given software application may include (but not necessarily) constituent software applications or modules (e.g., services, functions, procedures, computing objects, plugins, extensions, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Enterprise software applications, including applications for implementing cloud services, are often distributed among one or more servers as part of a computing domain, also called a server domain or server system herein. For the purposes of the present discussion, a computing domain may be any collection of one or more servers running software that is managed by a single administrative server or associated application or entity.

A cloud service may be any mechanism (e.g., one or more web services, Application Programming Interfaces (APIs), etc.) for enabling a user or other software program to employ data and/or functionality provided via a cloud. A cloud may be any collection of one or more servers. For example, certain clouds are implemented via one or more data centers with servers that may provide data, data storage, and other functionality accessible to client devices.

Generally, Global Traffic Management (GTM), also called Global Load Balancing (GLB) may be any method for selecting Domain Name System (DNS) Servers (also simply called DNSs) to serve client DNS requests. Note that network clients, such as browsers, mobile device apps, and so on, often rely upon DNSs to identify server IP addresses for accessing and/or interacting with content and functionality hosted by particular domains (e.g., www.example.com).

A network of data centers may be geographically distributed across large distances and be used to serve (i.e., host) a particular domain. GTM algorithms running on Application Delivery Controllers (ADCs) at each data center may monitor latency estimates between Local Domain Name Servers (LDNSs) and the various data centers, so as to select the data center offering the lowest latency for a particular LDNS and its clients communicating therewith.

For the purposes of the present discussion, an application delivery controller may be any functionality for facilitating implementing control over one or more servers or systems of a datacenter, e.g., as part of an Application Delivery Network (ADN), including, for instance, selectively controlling loads on different servers, performing GTM tasks, traffic shaping application-layer security, content switching, and so on.

For clarity, certain well-known components, such as hard drives, processors, operating systems, power supplies, routers, Internet Service Providers (ISPs), certain web services, virtual machines, middleware, MetaData Services (MDS) modules, Policy Decision Points (PDPs), Policy Information Points (PIPs), Policy Administration Points (PAPs), Policy Enforcement Points (PEPs), identity service providers, the Internet, root DNSs, and so on, are not necessarily explicitly called out in the figures. However, those skilled in the art with access to the present teachings will know which components to implement and how to implement them to meet the needs of a given implementation.

Figure 1:
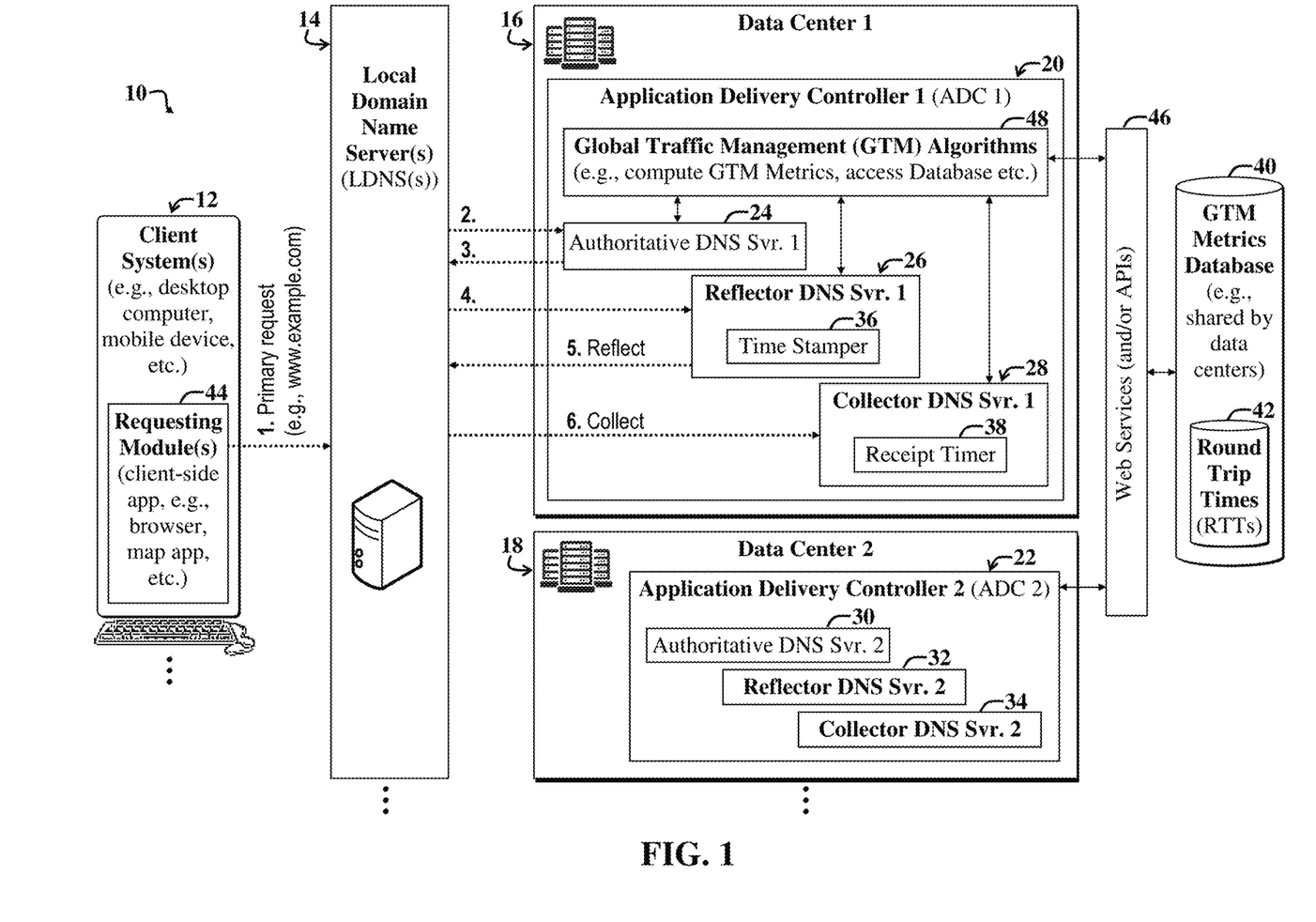
FIG. 1 illustrates a first example system and accompanying computing environment employing a Global Traffic Management (GTM) system using DNS reflection to facilitate populating a cloud-based database with latency metrics, called Round Trip Times (RTTs) usable to facilitate assigning a data center to service request messages (also simply called requests herein) from a particular Local Domain Name Server (LDNS).

FIG. 1 illustrates a first example system 10 and accompanying computing environment employing a GTM system 20, 22 using DNS reflection (also called DNS server reflection) to facilitate populating a cloud-based database 44 with latency metrics, called Round Trip Times (RTTs) 42 usable to facilitate assigning a data center 16, 18 to service request messages (also simply called requests herein) from a particular LDNS 14.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, in certain embodiments, the cloud-based GTM metrics database 40 may alternatively be implemented as a distributed database that is distributed and replicated among the data centers 16, 18. Furthermore, while ADCs 20, 22, are shown including various additional modules (e.g., modules 24-38) note that, in practice, the ADCs 20, 22 may merely front-end and/or control certain behaviors or processing tasks of the modules, such that they need not be shown as included within the ADCs 20, 22, but rather in communication therewith.

In the present example embodiment, one or more client systems 12 communicate with one or more LDNSs 14. In FIG. 1, an example LDNS 14 is shown communicating with multiple data centers 16, 18 servicing a particular domain (e.g., a domain identified by the primary domain name www.example.com). The example data centers 16, 18 include a first data center 16 and a second data center 18. Each data center 16, 18 includes an associated ADC 20, 22 that front-ends or otherwise controls or communicates with other DNS servers of the respective data centers. For instance, the first data center 16 includes a first ADC 20 that includes or communicates with GTM Algorithms 48 (which, in the present example embodiment, include load-balancing functionality, including GTM functionality), which also front-end, or at-least partially control a first authoritative DNS server 24, a first reflector DNS server 26, and a first collector DNS server 28.

For the purposes of the present discussion, software functionality may be any function, capability, or feature, e.g., stored or arranged data, that is provided via computer code, i.e., software. Software functionality may include actions, such as retrieving, performing a load-balancing task, an enterprise-related task, and so on.

An authoritative server may be any server that may delegate authority to process request messages or perform other tasks (such as determining IP addresses associated with CNAMEs indicated in request messages) to other servers of a given computing domain. Note that while the data centers 16, 18 each include respective authoritative DNS servers 24, 30 for domains hosted by the data centers 16, 18, embodiments are not limited thereto. For instance, a given primary domain (e.g., www.example.com) may employ a single authoritative DNS server to govern all DNS servers of data centers 16, 18 servicing the particular primary domain. Furthermore, in certain embodiments, the authoritative DNS servers 24, 30 may be omitted, without departing from the scope of the present teachings.

Similarly, the second data center 18 also includes GTM algorithms (not shown in the second data center 22) that control or affect message routing and processing for accompanying DNS servers, including a second authoritative DNS server 20, a second reflector DNS server 32, and a second collector DNS server 34.

For the purposes of the present discussion, a reflector DNS server may be any DNS server that includes or implements (or otherwise accesses and uses) functionality for selectively returning messages to an LDNS for resending elsewhere, e.g., to a collector DNS server. A collector DNS server may be any server with functionality for receiving and processing request messages that have been reflected from one or more reflector DNS servers.

A message is said to be reflected, e.g., by a reflector DNS server (e.g., the first reflector DNS server 26), if the request is returned (e.g., at step 5) to an LDNS (e.g., the LDNS 14, as step 5) for resending to the same or different DNS server (e.g., to the first collector DNS server 28). Note that the message that is resent (e.g., corresponding to a message at step 5) by the same DNS server (e.g., the first reflector DNS server 26) may include additional information (beyond that which was included in the initial message sent, e.g., sent at step 4, to a reflector DNS server by an LDNS server) in the reflected message (e.g., corresponding to the message at step 5, which is reflected back to the LDNS for further reflection to an indicated collector DNS server).

For instance, a reflector DNS server (e.g., the first reflector DNS server 26) may incorporate into a message reflected (e.g., at step 5) to the LDNS 14, the IP address of an intended recipient (e.g., an IP address of the first DNS collector server 28, also called a collector DNS server) of the reflected message, a time stamp at which the original request message was received (from the LDNS 14) by the reflector DNS server 26, and so on, as necessary to meet the needs of particular implementations of embodiment discussed herein.

Similarly, a message is said to be collected by a collector DNS server if a message sent by a reflector DNS server to an LDNS is then forwarded by the LDNS to the collector DNS server. A collector DNS server may be any DNS server that receives a reflected message, or modified version thereof (e.g., as may be selectively modified by an LDNS), from a reflector DNS server.

In the present example embodiment, the data centers 16, 18, including ADCs 20, 22 thereof, selectively communicate with a GTM metrics database 40 via a cloud-based web service 46. The ADCs 20, 22 may access and update the GTM metrics database 40 with metrics, such as Round Trip Times (RTTs) 42 for messages sent between the data centers 26, 18 and the LDNS(s) 14, as discussed more fully below. The GTM algorithms 48 select the best (fastest responding, i.e., exhibiting the lowest RTT) to service particular requests from the LDNS(s) 14, originating from associated client systems 12. The RTTs (and/or or physical distance estimates, also called proximity estimates) used by the GTM algorithms 48 may be based upon a combination of static (i.e., passive), active, and local reflection methods, as discussed more fully below.

For the purposes of the present discussion, a local reflection method may be any method for estimating RTTs between a data center (and/or accompanying servers therein) and an LDNS, e.g., the LDNS 14, that uses co-located reflector DNS servers (e.g., the first reflector DNS server 26 and the collector DNS server 28). DNS servers are said to be co-located if they are within the same data center and/or running on the same machine, i.e., computer. For the purposes of the present discussion, a data center may be any building (and accompanying computers) used to house multiple computers and/or software systems, such as servers of a server system. A server system may be any collection of one or more servers.

In the present example embodiment, the client system(s) 12 communicating with the LDNS(s) 14 are approximately similarly located geographically, such that the client system(s) 12 are said to be local to their respective LDNSs 14, and the LDNSs 14 are said to be local to the client system(s) 12 communicating therewith. Note that the term "DNS," depending upon the context in which the term is used, may refer to "Domain Name System" or "Domain Name Server." In some instances, a domain name server may be simply called a "DNS" as opposed to a "DNS server."

The example client system 12 includes one or more requesting modules 44 used to issue requests (also called request messages herein) to the LDNS 14. The requesting module 44 may be implemented via one or more browsers, mobile device apps, and/or other software. In an example scenario, the requesting module 44 represents a browser, wherein a user may enter a domain name, e.g., www.example.com.

The browser 44 then issues a DNS request (step 1 in FIG. 1) to the LDNS 14, which includes DNS resolver functionality for facilitating resolving the request, e.g., for www.example.com, to its IP address (after communications with other DNS servers, as discussed more fully below). For the purposes of the present discussion, the initial request specifying "www.example.com" represents a primary request, and "www.example.com" represents a primary domain name. Other aliases for the primary domain name include the CNAME (Canonical Name) and the IP address(es) associated therewith.

In practice, the LDNS 14 may first communicate with an Internet root server and a Top-level Domain Name Server (TDNS) (e.g., serving the .com domain), so as to obtain an IP address for an authoritative DNS server, e.g., a first authoritative DNS server 24 of a first data center 16. The first authoritative DNS server 24 has authority over other DNS servers 26, 28 of the computing domain represented by the first data center 16.

After obtaining the IP address for the first authoritative DNS server 24 and a CNAME associated with the primary request (e.g., the CNAME associated with www.example.com) from a TDNS, the LDNS 14 may then use the retrieved CNAME and IP address of the associated authoritative DNS server 24 to issue a request thereto for an IP address associated with the CNAME characterizing the primary domain request.

In the present example embodiment, to implement DNS reflection so as to measure or estimate the RTT between the LDNS 14 and the first data center 16, the first authoritative DNS server 24 directs (at step 3) the LDNS 14 to return the request to the first reflector DNS server 26 that is co-located in the same data center or machine as the first reflector DNS server 26. The message returned by the first authoritative DNS server 24 to the LDNS 24 includes the IP address of the first reflector DNS server 26 and a CNAME for the primary domain name (e.g., for www.example.com). Accordingly, the request message returned or reflected from the first authoritative DNS server 24 to the LDNS 14 includes instructions or information for the LDNS 14 specifying where to send the returned request message.

Accordingly, the LDNS 14 returns the request (at step 3) from the first authoritative DNS server 24 to the first reflector DNS server 26, as specified in the return message (issued by the first authoritative DNS server 24 to the LDNS 14 at step 3). The LDNS 14 then forwards the request (at step 4) to the first reflector DNS server 26.

The first reflector DNS server 26 then time stamps, e.g., via a time stamper 26, the message (received at step 4) and reflects it (i.e., a modified version thereof specifying the IP address of the first collector DNS server 28) back to the LDNS 14, which then returns (at step 6) a modified version of the reflected DNS request (that was reflected at step 5) to the first collector DNS server 28, as specified by the IP address of the first collector DNS server 28 in the reflected message (at step 5) reflected by the first reflector DNS server 26.

The first collector DNS server 28 then times (e.g., via a receipt timer 38) the receipt of the collected DNS request (collected at step 6) that was reflected to the first collector DNS server 28 via the LDNS 14, responsive to receipt of the reflected message (at step 5) reflected by the first reflector DNS server 26. The time stamp of the collected message is then subtracted from the receipt time to determine an estimate of the RTT for the request message between the LDNS 14 and the first data center 16. An estimate of the RTT is called an RTT value herein. The RTT value may then be stored in the GTM metrics database 40 among any preexisting RTTs 42 in the GTM metrics database 40.

Similarly, upon receipt of a second request from one or more of the client systems 12, the second data center 18 and accompanying authoritative DNS server 30 may handle the request and estimate an RTT value between the second data center 18 and the LDNS 14 using reflection (as discussed above) involving the second reflector DNS server 32 and associated collector DNS server 34. The second RTT may also be stored in the GTM metrics database 40, which is accessible and updatable by the ADCs 20, 22 of the different data centers 16, 18 servicing a particular domain. The RTTs 42 stored in the shared GTM metrics database 40 are then usable by the ADCs 20, 22 to redirect (or process as needed) received request messages, in accordance with the RTTs for each data center 16, 18 and each LDNS 14.

For example, if the second ADC 22 receives a request associated with an LDNS that exhibits a shorter RTT between the LDNS and another data center, e.g., the first data center 16, the second ADC 18 may direct the LDNS 14 to issue the request (and subsequent requests, for a predetermined time interval) to the first data center 16 and accompanying first ADC 20. Similarly, the first ADC 20 may direct requests to be handled or processed by the second ADC 22 of the second data center 18, when the RTT between the LDNS 14 and the second data center 18 is shorter than the RTT between the LDNS 14 and the first data center 16.

Note that in certain implementations, the GTM metrics database 40 is initially populated with proximity data specifying relative geographic distances between the LDNSs 14 and the data centers 16, 18 that are communicating with the LDNSs 14. Initially, the proximity data can be used to obtain rough estimates of RTTs (or other suitable metrics) for enabling the ADCs 20, 22 to implement GTM algorithms 48 to route messages between the LDNSs 14 and the data centers 16, 18 based on estimates as to which of the data centers 16, 18 can provide the quickest response times for the LDNSs 14. This initial proximity data can be progressively replaced with more accurate data, as discussed more fully below.

For instance, after the GTM metrics database 40 is initialized with proximity data, the data can be further refined and/or updated using active methods, such as use of pings (e.g., using Internet Control Message Protocol (ICMP) echo requests and replies) or queries (e.g., using Transmission Control Protocol (TCP) SYNchronization, SYNchronization-ACKnowledgement, and ACKnowledgement handshake queries).

However, such active methods may not reach all applicable data centers, and certain RTT values in the GTM metrics database 40 may remain unmeasured, or otherwise inaccurate. Accordingly, local DNS reflection methods discussed herein are selectively used to further revise, update, and/or augment the RTTs 42 in the GTM metrics database 40 with more accurate values.

Alternatively, in certain embodiments, conventional passive proximity methods and/or active methods need not be used, and instead DNS reflection methods discussed herein may replace the passive and/or active initialization of values in the GTM metrics database 40. Note that the term "active method," used here may refer to any method that issues a query or other instruction so as to measure a GTM metric, e.g., for storage in the GTM metrics database 40. Accordingly, DNS reflection also represents an active method. However, in various embodiments, other active methods (e.g., involving issuance of pings or queries) are first used to initialize the GTM metrics database 40 with initial RTT values 42, which can then be subsequently periodically revised, updated, and/or augmented using DNS reflection and/or any other available techniques, depending upon the needs of a given implementation.

Accordingly, the GTM algorithms 48 implement Global Load Balancing (GLB) functionality leveraging RTTs 42 determined via local DNS reflection methods discussed herein. The receiving ADC 20 facilitates resolving a particular received DNS request (e.g., to resolve a particular domain name and associated CNAME to an IP address) from and LDNS, to an IP address of a data center (from among applicable data centers 16, 18 servicing the domain specified in the request) that is estimated to provide the quickest response time for the processing of the request. This is facilitated by accurate RTT measurements maintained in the GTM metrics database 40.

Note that metrics, e.g., RTTs 42, maintained by the GTM metrics database 40 may periodically expire, in accordance with predetermined Time-To-Live (TTL) values. Exact values for the TTL values may be implementation specific and may vary, without departing from the scope of the present teachings.

Figure 2:
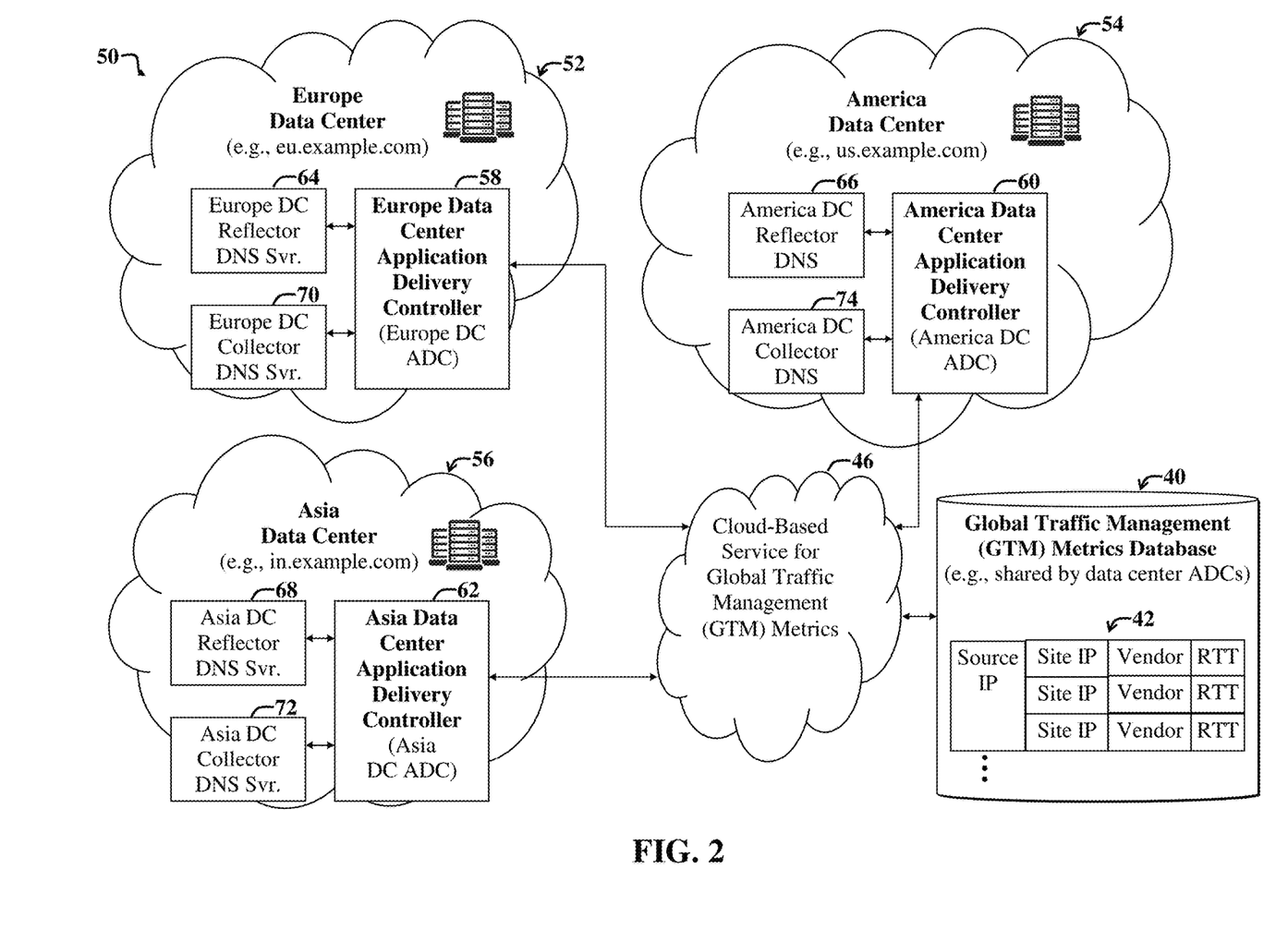
FIG. 2 is illustrates a second example system and accompanying computing environment configured to enable GTM using DNS reflection to estimate RTTs and selectively populate the cloud-based database used by Application Delivery Controllers (ADCs) of geographically distributed data centers to facilitate distribution of network traffic and loads among the data centers.

FIG. 2 is illustrates a second example system 50 and accompanying computing environment configured to enable GTM using DNS reflection to estimate RTTs 42 and to selectively populate the cloud-based database 40 used by Application Delivery Controllers (ADCs) 58-62 of geographically distributed data centers 52-56 to facilitate distribution of network traffic and loads among the data centers 52-56.

The first example data center 52 represents a data center located in Europe, i.e., represents the Europe data center used to service a particular domain (e.g., www.example.com). The Europe data center 52 is front-ended or otherwise subject to GTM and associated GLB algorithms of a Europe ADC 58. The Europe ADC communicates with Europe Data Center (DC) reflector DNS server 64 and a Europe DC collector DNS server 70 and selectively uses the DNS servers 64, 70 to measure or estimate RTTs between itself and LDNSs communicating therewith, i.e., issuing DNS requests (e.g., for IP addresses to service the associated requests). As discussed above with reference to FIG. 1, and as discussed more fully below, the Europe ADC 58 selectively populates the GTM metrics database 40 with RTTs 42 that it has measured.

If the Europe data center 52 has not yet measured RTTs, then corresponding entries in the GTM metrics database 40 may be populated with metrics indicative of global proximity and/or active measurements using timed pings or queries. Note that, in certain embodiments, initial data obtained via global proximity estimates and/or active pings or queries need not be overwritten by RTTs determined using DNS reflection methods discussed herein. Certain algorithms may use a combination of passive and active data, including reflection-based measurements or estimates, and need not rely upon only one type of GTM metric.

Similarly, an America data center 54, e.g., which may be located in the United States (for instance), includes an America ADC 60 that fronts an associated an America DC reflector DNS server 66 and collector DNS server 74, which are used to actively measure or estimate RTTs between the America data center 54 and LDNSs communicating therewith.

Similarly, an Asia data center 56, which may be located in India (for instance), includes an Asia ADC 62 that fronts an associated Asia DC reflector DNS server 68 and DNS collector DNS server 72, which are used to actively measure or estimate RTTs between the Asia data center 56 and LDNSs communicating therewith.

Note that generally, the reflector DNS servers 64-68 and collector DNS servers 70-74 need not be limited to use in implementing reflection or collection methods so as to measure or estimate RTTs used to update the shared GTM metrics database 40. In practice, the servers 64-68, 70-74 may also service (i.e., process) requests when the associated ADCs 58-62, respectively, have been selected for processing.

When not using DNS reflection to calculate RTTs, and an ADC has been selected for processing a given request, the associated data center (in which the ADC is located) is said to have been selected to process the given request. Any of the ADCs 58-62 that receives an initial DNS request from a particular LDNS may subsequently direct the request (via signaling with the LDNS) to another ADC and associated data center.

Accordingly, the ADC to first receive the request may determine (e.g., by reference to the GTM metrics database 40 and accompanying RTTs 42) the data center to best handle the request based on which data center exhibits the lowest latency (e.g., RTT value). Note that the RTTs of the GTM metrics database 40 may be arranged in a table that indicates a source IP address (e.g., an IP address of the client device 12 and/or the LDNS 14 of FIG. 1) and RTTs for domains, such as different IP addresses associated with different websites of a given primary domain. Vendor information (e.g., describing the maker and/or seller of a given LDNS and/or website) may also be included in the table listing the RTTs 42.

Generally, when an ADC 58-62 receives an initial request from a particular LDNS, it may reference the GTM database 40 (using a cloud-based web service for GTM metrics 42) to determine if the GTM metrics database 40 has a current (i.e., entered and not timed out) RTT entry for the RTT between the ADC 58-62 and the LDNS. If not, the ADC may act to update the GTM metrics database 40 using methods discussed herein, including DNS reflection methods.

The ADCs 58-62 may also use the GTM metrics database 40 to reference not only the RTT values (also simply called RTTs herein) between their respective data centers 52-56 and LDNSs communicating therewith, but each may check other RTTs for other data centers 52-56 communicating with the same LDNS associated with a received DNS request. If another data center (i.e., one of the data centers 52-56) is associated with a shorter latency (i.e., the shortest RTT value) in the GTM metrics database 40, then the receiving ADC (i.e., one of the ADCs 58-62) may return a message to the issuing LDNS (that issued the request to the receiving ADC) directing further communications with the ADC and associated data center exhibiting the shorter (or shortest) RTT.

Accordingly, data centers 52-56 are selected (by the ADCs 58-62) to process particular DNS requests (and associated subsequent requests referencing the initial primary domain and associated IP address(es)) for particular LDNSs based on the shortest RTTs shortest RTTs between the data center and LDNSs communicating therewith.

Furthermore, note that in certain embodiments, the data centers 52-56 may intercommunicate and share information as part of a mesh network. Embodiments are not limited to use of the could-based service 46 for enabling the ADCs 58-62 to intercommunicate via the GTM metrics database 40. In other embodiments, the ADCs 58-62 and associated data centers 52-56 may employ a distributed database (e.g., a distributed ledger) to intercommunicate and share data.

Additional details as to meshed data centers that share GTM metrics are discussed more fully in the above-identified U.S. patent application, entitled METHOD AND APPARATUS FOR ACCURATE GLB ACHIEVED BY USING DISTRIBUTED DNS REFLECTION, which is fully incorporated herein by reference, as set forth above.

Figure 3:
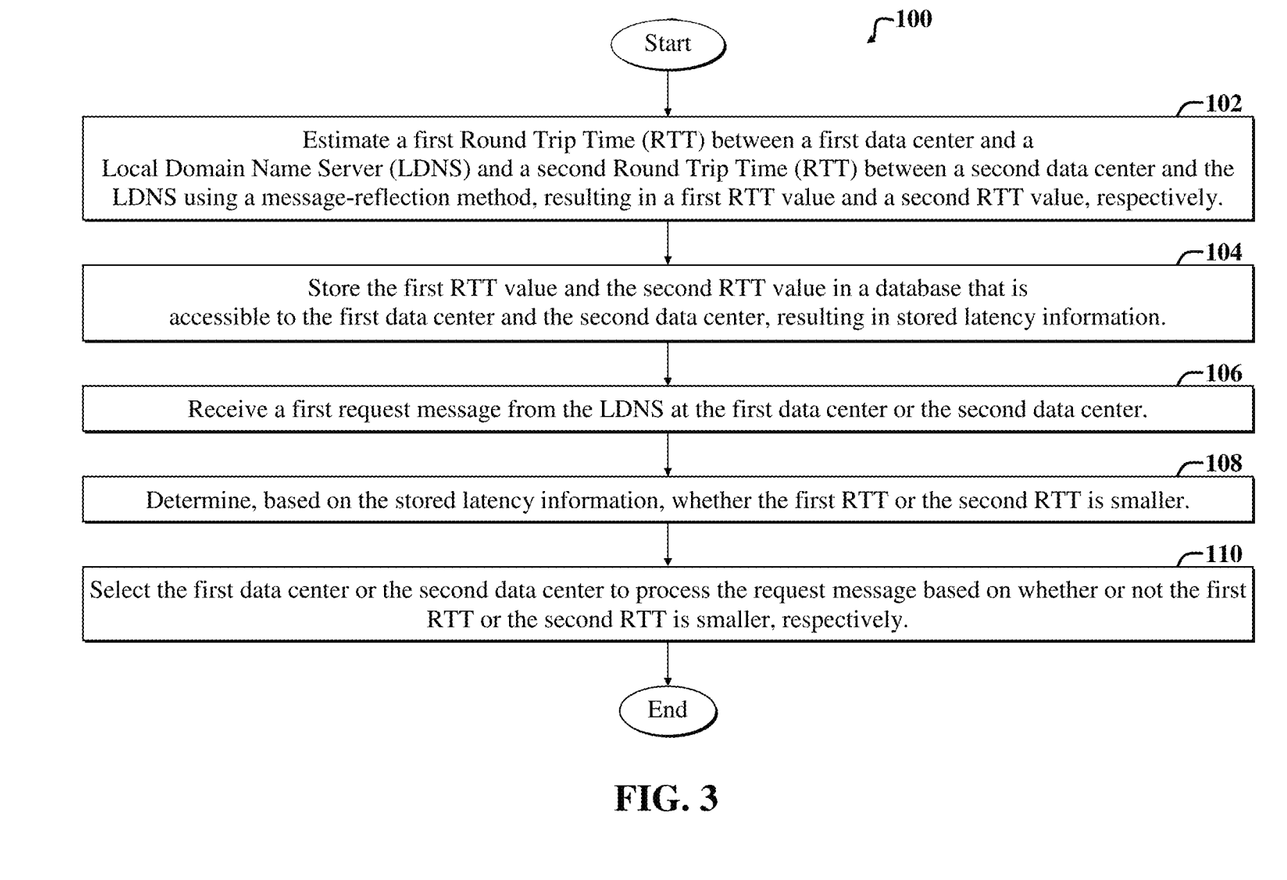
FIG. 3 is a flow diagram of a first example method usable by the embodiments of FIGS. 1-2.

FIG. 3 is a flow diagram of a first example method 100 usable by the embodiments of FIGS. 1-2 for facilitating GTM using DNS reflection.

An initial RTT-estimation step 102 includes estimating a first RTT between a first data center (e.g., the data center 16 of FIG. 1) and an LDNS (e.g., the LDNS and a second Round Trip Time (RTT) between a second data center (e.g., the second data center 18 of FIG. 1) and the LDNS using a message-reflection method, resulting in a first RTT value and a second RTT value, respectively.

A subsequent RTT-storing step 104 includes storing the first RTT value and the second RTT value in a database (e.g., the GTM metrics database 40 of FIG. 1) that is accessible to the first data center and the second data center, resulting in stored latency information.

For the purposes of the present discussion, the term latency may refer to any time interval (e.g., RTT), or collection of time intervals (or representations or estimates thereof, e.g., based on static proximity estimates) between the issuance of a message by a node of a network and receipt of the sent message or version thereof by another node or same node of the network. A node may be any computer system and/or software application and/or software system, or groups thereof, that are coupled to a network. For instance, the LDNS 14 and DNS servers 24-34 of FIG. 1 are examples of network nodes.

Subsequently, a message-receiving step 106 includes receiving a first request message from the LDNS at the first data center or the second data center.

Next, metrics-analysis step 108 includes determining, based on the stored latency information, whether the first RTT or the second RTT is smaller.

Then, a data-center selection step 110 includes selecting the first data center or the second data center to process the request message based on whether or not the first RTT or the second RTT is smaller, respectively.

Note that the first example method 100 may be modified without departing from the scope of the present teachings. For example, certain steps may be added, removed, interchanged with other steps, and so on, without departing from the scope of the present teachings.

For example, the method 100 may further include or specify using a web service or Application Programming Interface (API) (e.g., the cloud-based web service 46 of FIGS. 1 and 2) to facilitate providing access to the database by the first data center and the second data center.

The first example method 100 may further specify that the first request message specifies a CNAME (Canonical Name) of a domain name, e.g., pertaining to a primary domain name (e.g., www.example.com) is specified by a client device in communication with the LDNS, and wherein the LDNS sends the first request message to the first data center or the second data center after a query specifying the domain name from the client device and after retrieval of the CNAME by the LDNS. The LDNS may retrieve the CNAME by first accessing an Internet root DNS server (or server system) to identify a Top-level DNS server (TDNS). In FIG. 1, the TDNS may refer to the first authoritative DNS server 24, which may return the CNAME of the requested primary domain to the LDNS 14 of FIG. 1.

Accordingly, the initial request message may originate from (or be initiated by) a client system (e.g., the client system 12 of FIG. 1) and may represent a request to access content and functionality of a particular domain (e.g., www.example.com), where the request is initially sent to the LDNS to facilitate domain name resolution, i.e., resolving the primary domain name specified in the request to is CNAME, and, ultimately, it's IP address. After the LDNS obtains the IP address for the domain name at a data center exhibiting the lowest RTT metrics (as selected by GTM algorithms running on ADCs of the data centers), the IP address is provided to the client (e.g., the client system 12 of FIG. 1).

The first example method 100 may further include determining whether or not one or more of the first RTT value or the second RTT value, as measured using the message reflection method, preexists in the database; and initializing the database with one or more first RTT estimates obtained using a passive method when the database has not yet been populated with the first RTT value or the second RTT value and when the database has not yet been populated with second RTT estimates obtained using an active method.

The passive method may include providing the one or more first RTT estimates based on location information pertaining to the first data center, the second data center, and the LDNS. The active method may include selectively probing the LDNS using one or more pings or queries to obtain the second RTT estimates. This type of probing may be implemented by one or more of the DNS servers 24-34 of FIG. 1, e.g., at the direction of their accompanying ADCs 20, 22. The first RTT value and the second RTT value represent third RTT estimates that are obtained using the message-reflection method.

The first example method 100 may further specify that the first data center includes a first ADC (e.g., the ADC 20 of FIG. 1), and the second data center includes a second ADC (e.g., the ADC 30 of FIG. 1). The first ADC may communicate with a first reflector DNS server and a first collector DNS server. The second ADC may communicate with a second reflector DNS server and a second collector DNS server. The first message may include or represent a DNS request message.

The example reflection method for measuring or estimating RTTs, so as to arrive at RTT values, may include, for instance determining the first RTT value by: receiving, at the first reflector DNS server at the first data center, the first request message; augmenting the first request message with a first time stamp and an Internet Protocol (IP) address of the first collector DNS server, resulting in an adjusted first message; sending the adjusted first message to the LDNS (e.g., at step 5 in FIG. 1), whereby the adjusted first message represents a first reflected request message; receiving at the first collector DNS server a first return message (e.g., representing the message at step 6 in FIG. 1) from the LDNS in response to the receipt of the first reflected request message; comparing (e.g., via the GTM algorithms 48 of FIG. 1) the first time stamp with a time at which the first collector DNS server receives the first return message; and estimating the first RTT based on the comparing.

Accordingly, the ADCs at various data centers hosting a particular domain may run GTM algorithms for selecting the best (estimated to exhibit the lowest latency) data center using a selective combination of static, active, and DNS reflection techniques. A web service may provide shared access for the data centers to retrieve and update RTT metrics that estimate latencies to/from different LDNSs to the data centers.

Figure 4:
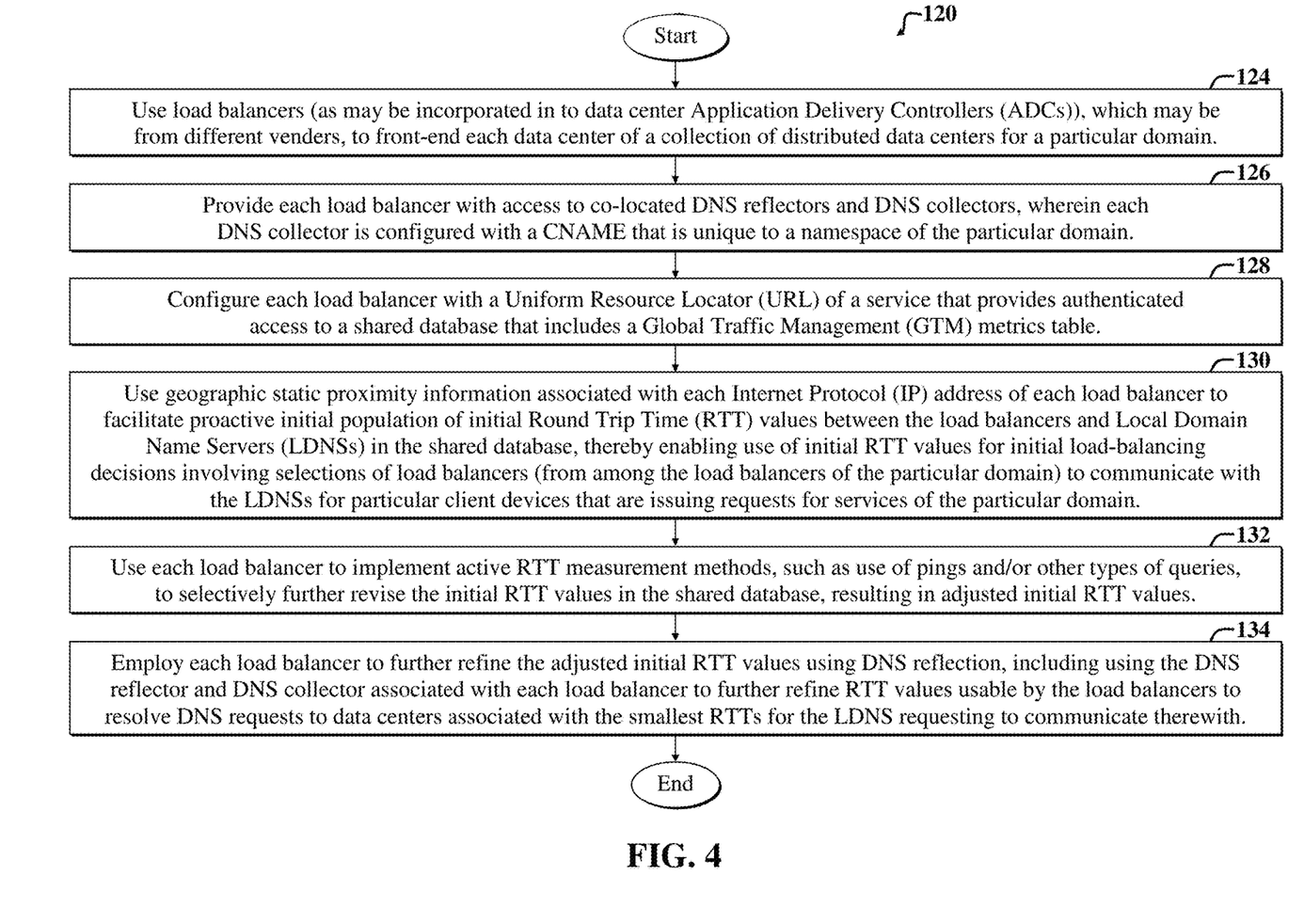
FIG. 4 is a flow diagram of a second example method usable by the embodiments of FIGS. 1-3.

FIG. 4 is a flow diagram of a second example method 120 usable by the embodiments of FIGS. 1-3.

The second example method 120 includes a first step 124, which involves using load balancers (e.g., corresponding to the GTM algorithms 48 of FIG. 1), which may be from different venders, to front-end each data center of a collection of distributed data centers (e.g., the data centers 16, 18 of FIG. 1 and the data centers 52-56 of FIG. 2) for a particular domain.

A second step 126 includes providing each load balancer with access to a DNS reflector (also called reflector DNS server) and DNS collector (also called collector DNS server) that are co-located on the same computer and/or data center of the load balancer. Each DNS reflector acts a master to each associated co-located DNS collector. Each DNS collector is configured with a CNAME that is unique to a namespace of the particular domain being hosted/serviced by the data center and associated ADC running the load balancer (i.e., Global Load Balancer (GLB)).

A third step includes configuring each load balancer with a Uniform Resource Locator (URL) of a service that provides authenticated access to a shared database (e.g., the GTM metrics database 40 of FIGS. 1 and 2) that includes a GTM metrics table (e.g., the table 42 of FIG. 2).

A fourth step 130 includes using geographic static proximity information associated with each IP address of each load balancer to facilitate proactive initial population of initial RTT values. The RTT values in the database indicate latencies between the load balancers and LDNSs. The fourth step 130 further includes using initial RTT values to facilitate initial load-balancing decisions involving selections of load balancers (from among the load balancers of the particular domain) to communicate with the LDNSs. The LDNSs are associated with (i.e., communicate with) client devices that are issuing requests for services of the particular domain.

A fifth step 132 includes using each load balancer to implement active RTT measurement methods, such as use of pings, and/or other types of queries, to selectively revise (e.g., further refine, update, etc.) the initial RTT values in the shared database, resulting in adjusted initial RTT values.

A sixth step 134 includes employing each load balancer to further refine the adjusted RTT values using DNS reflection. The DNS reflection may include using the DNS reflector and DNS collector associated with each load balancer to provided further refined or otherwise updated RTT values usable by the load balancers to facilitate resolving DNS requests and associated message processing to a data center that is associated with the smallest RTT between the data center and LDNS requesting to communicate therewith.

Note that the second example method 120 may be altered, without departing from the scope of the present teachings. For example, the method 120 may specify various loops or cycles; certain steps may be omitted, modified, added, and so on.

For example, the method 120 may further specify that access to the GTM metrics database (e.g., the GTM metrics database 40 of FIGS. 1-2) may be provided by a cloud service that acts to store RTT values from each website (and associated data center) to each LDNSs of the computing environment in an RTT table or latency table.

The second example method 120 may further specify that load balancers implemented by ADCs front-end each data center. ADCs at each data center may be from different vendors, i.e., different existing ADC technologies may be readily adapted for use with embodiments discussed herein, without undue experimentation or modification.

Each ADC is configured with a URL for the cloud service providing access (e.g., the ability to download, update, etc., depending upon permissions granted to the data centers for use of the cloud service) to the shared GTM metrics of the GTM metrics database.

The second example method 120 may further specify that each ADC authenticates with the cloud service (e.g., corresponding to the cloud-based service 46 and accompanying GTM database 40 of FIG. 2). The ADCs participate in a protocol for the download of the RTT table via the cloud service. Exact details of the protocol (for ADCs of data centers interacting with the cloud service and downloading and uploading or updating data in the GTM metrics database) are implementation specific and may vary, so as to meet the needs of a given implementation.

The second example method 120 may further specify that each DNS reflector acts as a master for the DNS collector in the same data center. Each collector in the topology may exhibit a unique CNAME (i.e., unique to the applicable namespace) for the given domain hosted behind the ADC and accompanying GTM/GLB algorithms.

The second example method 120 may further specify an initialization step that may include using a geo and IP-location database (data of which may or may not be included among the GTM metrics database 40 of FIGS. 1 and 2) is loaded by all ADCs (GTM devices, aka load-balancing devices).

When a new DNS query arrives, the ADC load-balancing decision may initially occurs using static proximity data (e.g., as provided via a geo-location service).

Each ADC may selectively proactively measure or estimate the RTT values using IP addresses associated with proximity information in the geo-IP database, so as to proactively build the RTT table. Populating of the RTT table (e.g., the table 42 in FIG. 2) may occur cross-domain, such that RTTs may be estimated for multiple domains that may be hosted by a given data center.

Each ADC may detect if the RTT database entries are not yet provided (e.g., not yet provided via active and/or DNS reflection methods). An ADC (and accompanying GTM algorithms) can then proactively use active-measurement techniques, such as by using timed pings (e.g., ICMP echo requests and replies) and/or other timed queries (e.g., using TCP SYN and ACK handshake queries) to further initialize that GTM metrics database with RTT values for facilitating subsequent use of the values for GTM decision-making, i.e., for implementing global load balancing.

Note that RTT values or other latency information or estimates may be tagged with indicators identifying how the estimates were provided (e.g., via pings, DNS reflection, etc.). In certain implementations, the tags or indicators may be implemented by virtue of storage location in the GTM database. For instance, static proximity data, RTT values estimated using active pings or queries, and RTT values estimated using DNS reflection may be stored in different databases or different sections of the same database, different tables in the same database, and so on.

Initial RTT values estimated using active pings or queries can be further updated with or augmented with RTTs constructed using DNS reflection.

The second example method 120 may further specify that the DNS reflection further includes or specifies that when a DNS query (i.e., request) arrives to an ADC, the ADC directs a DNS reflector and a DNS collector in the same or similar physical location or device at the same data center to estimate RTTs using DNS reflection; then updating the GTM metrics database with the RTT values obtained via DNS reflection.

As DNS requests from the same or different LDNS arrive at other ADCs, eventually the ADCs will compute the RTTs characterizing the latencies between the LDNS(s) and the other ADCs and associated data centers. The GTM metrics database is then updated with the new RTTs via the cloud service fronting the GTM metrics database.

Note that since DNS reflection-based RTT only measures the RTTs between a single data center and LDNSs for client-initiated requests, the receiving ADC may compare an RTT computed by DNS reflection with any corresponding RTT supplied by one or more peer ADCs (of different data centers) using active pings or queries, in the case that the RTT data has not been previously initialized or calculated by relevant peers (other ADCs) of the computing environment.

The ADCs front ending the data centers may periodically check if the RTT metrics table (e.g., the table 42 of FIG. 2) is updated; and if so; then periodically (e.g., at implementation-specific intervals, e.g., at 1 hour refresh rates) download the latest RTT metrics table.

The second example method 120 may further specify using the data center exhibiting the lowest RTT value for the purposes of routing traffic between the clients of the LDNS and the data center.

In case the RTT computation is not done for all of the data centers for a given domain, the best DC selection may be based on a configured threshold number of data centers are able to measure the RTT using active or passive (e.g., using static proximity) methods.

Note that an ADC may account for additional factors when making GTM decisions. For instance, an ADC may account for data center load, status, and so on, without departing from the scope of the present teachings.

Figure 5:
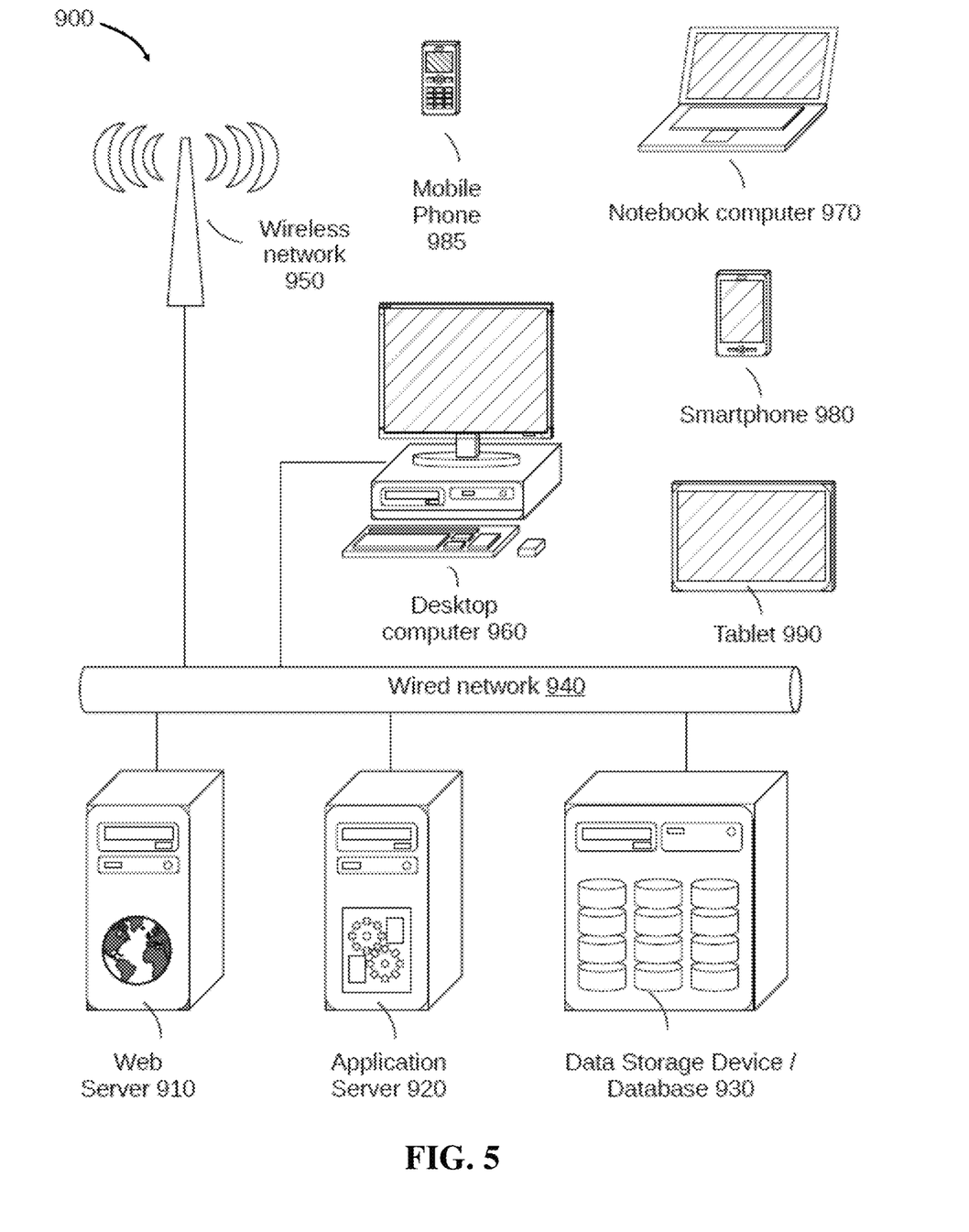
FIG. 5 is a general block diagram of a system and accompanying computing environment usable to implement the embodiments of FIGS. 1-4.

FIG. 5 is a general block diagram of a system 900 and accompanying computing environment usable to implement the embodiments of FIGS. 1-4. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 5, the client system(s) 12 of FIG. 1 may be implemented via one or more of the desktop computer 960, tablet 990, smartphone 980, notebook computer 970, and/or mobile phone 985 of FIG. 5. The data centers 16, 18 and accompanying servers 24-34 of FIG. 1 may be implemented via the web server 910 and/or application server 920 of FIG. 5.

In one example scenario, the GTM algorithms 48 run on an application server (e.g., the application server 920 of FIG. 5), but are accessible (to authenticated users and client-side software) via webpage code of a website hosted by the web server 910 of FIG. 5. The GTM metrics database 40 may be maintained via the data storage device 930 of FIG. 5, which may store so-called cloud-based data, including GTM metrics, such as RTTs, and may further include or represent backend databases accessible via software running on the application server 920.

Figure 6:
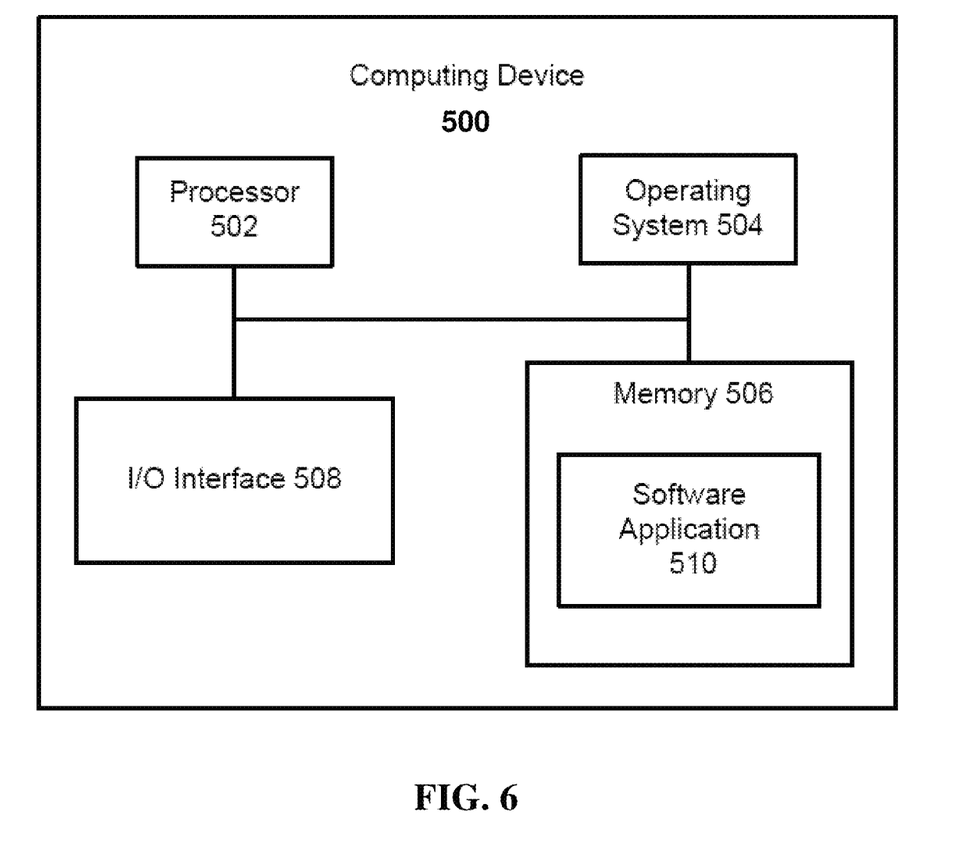
FIG. 6 is a general block diagram of a computing device usable to implement the embodiments of FIGS. 1-5.

FIG. 6 illustrates a block diagram of an example computing system 500, which may be used for implementations described herein. For example, computing system 500 may be used to implement server devices 910, 920 of FIG. 5 as well as to perform the method implementations described herein. In some implementations, computing system 500 may include a processor 502, an operating system 504, a memory 506, and an input/output (I/O) interface 508.

In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain specific embodiments discussed herein are configured to facilitate the elimination of stale browser sessions via selective injection of code in response messages for client-side execution, embodiments are not limited thereto. For example, code or scripts injected into the response messages may be configured to perform other functions, such as implementing browser plugins to enhance network security, and so on. Furthermore, note that request messages may also be selectively modified (e.g., injected) with code for subsequent server-side execution.

Although the description has been described with respect to particular embodiments thereof, these particular embodiments are merely illustrative, and not restrictive. For example, while various embodiments have been discussed herein with reference to use of reflection to estimate RTTs for the purposes of GTM, embodiments are not limited thereto. Other types of load balancing or network traffic control can be facilitated by or implemented using DNS reflection methods discussed herein that are not necessarily based on DNS messaging, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory processor-readable medium including instructions executable by one or more processors, and when executed operable for:

estimating a first Round Trip Time (RTT) between a first data center and a Local Domain Name Server (LDNS) and a second Round Trip Time (RTT) between a second data center and the LDNS using a message-reflection method, resulting in a first RTT value and a second RTT value, respectively;

storing the first RTT value and the second RTT value in a database that is accessible to the first data center and the second data center, resulting in stored latency information;

receiving a first request message, at the LDNS, from a client that is remotely located from the first data center and the second data center;

receiving a first request message from the LDNS at the first data center or the second data center;

determining, based on the stored latency information, whether the first RTT or the second RTT is smaller; and selecting the first data center or the second data center to process the first request message based on whether or not the first RTT or the second RTT is smaller, respectively.

2. The non-transitory processor-readable medium of claim 1, further including using a web service or Application Programming Interface (API) to facilitate providing access to the database by the first data center and the second data center.

3. The non-transitory processor-readable medium of claim 1, wherein the first request message specifies a CNAME (Canonical Name) of a domain name, wherein the domain name is specified by a client device in communication with the LDNS, and wherein the LDNS sends the first request message to the first data center or the second data center after a query specifying the domain name from the client device is received by the LDNS and after retrieval of the CNAME by the LDNS.

4. The non-transitory processor-readable medium of claim 3, wherein retrieval of the CNAME by the LDNS includes first accessing a root DNS server to identify a Top-level DNS server (TDNS), and then using the TDNS to obtain the CNAME for use in constructing the first request message.

5. The non-transitory processor-readable medium of claim 1, wherein estimating further includes:

determining whether or not one or more of the first RTT value or the second RTT value, as measured using the message-reflection method, preexists in the database; and initializing the database with one or more first RTT estimates obtained using a passive method when the database has not yet been populated with the first RTT value or the second RTT value and when the database has not yet been populated with second RTT estimates obtained using an active method.

6. The non-transitory processor-readable medium of claim 5, wherein the passive method includes providing the one or more first RTT estimates based on location information pertaining to the first data center, the second data center, and the LDNS.

7. The non-transitory processor-readable medium of claim 5, wherein the active method includes selectively probing the LDNS using one or more pings or queries to obtain the second RTT estimates.

8. The non-transitory processor-readable medium of claim 7, wherein the first RTT value and the second RTT value represent third RTT estimates obtained using the message-reflection method.

9. The non-transitory processor-readable medium of claim 1, wherein the first data center includes a first Application Delivery Controller (ADC); wherein the second data center includes a second ADC; wherein the first ADC communicates with a first reflector Domain Name System (DNS) server and a first collector DNS server; wherein the second ADC communicates with a second reflector DNS server and a second collector DNS server; and wherein the first request message includes a DNS request message.

10. The non-transitory processor-readable medium of claim 9, wherein the message-reflection method includes determining the first RTT value by:

receiving, at the first reflector DNS server at the first data center, the first request message;

augmenting the first request message with a first time stamp and an Internet Protocol (IP) address of the first collector DNS server, resulting in an adjusted first message;

sending the adjusted first message to the LDNS, whereby the adjusted first message represents a first reflected request message;

receiving at the first collector DNS server a first return message from the LDNS in response to receiving the first reflected request message;

comparing the first time stamp with a time at which the first collector DNS server receives the first return message; and estimating the first RTT based on the comparing.

11. A method for facilitating Global Traffic Management (GTM), the method comprising:

estimating a first Round Trip Time (RTT) between a first data center and a Local Domain Name Server (LDNS) and a second Round Trip Time (RTT) between a second data center and the LDNS using a message-reflection method, resulting in a first RTT value and a second RTT value, respectively;

storing the first RTT value and the second RTT value in a database that is accessible to the first data center and the second data center, resulting in stored latency information;

receiving a first request message, at the LDNS, from a client that is remotely located from the first data center and the second data center;

receiving a first request message from the LDNS at the first data center or the second data center;

determining, based on the stored latency information, whether the first RTT or the second RTT is smaller; and selecting the first data center or the second data center to process the first request message based on whether or not the first RTT or the second RTT is smaller, respectively.

12. The method of claim 11, further including using a web service or Application Programming Interface (API) to facilitate providing access to the database by the first data center and the second data center.

13. The method of claim 11, wherein the first request message specifies a CNAME (Canonical Name) of a domain name, wherein the domain name is specified by a client device in communication with the LDNS, and wherein the LDNS sends the first request message to the first data center or the second data center after a query specifying the domain name from the client device is received by the LDNS and after retrieval of the CNAME by the LDNS.

14. The method of claim 13, wherein retrieval of the CNAME by the LDNS includes first accessing a root DNS server to identify a Top-level DNS server (TDNS), and then using the TDNS to obtain the CNAME for use in constructing the first request message.

15. The method of claim 11, wherein estimating further includes:
   determining whether or not one or more of the first RTT value or the second RTT value, as measured using the message-reflection method, preexists in the database; and
   initializing the database with one or more first RTT estimates obtained using a passive method when the database has not yet been populated with the first RTT value or the second RTT value and when the database has not yet been populated with second RTT estimates obtained using an active method.

16. The method of claim 15, wherein the passive method includes providing the one or more first RTT estimates based on location information pertaining to the first data center, the second data center, and the LDNS.

17. The method of claim 15, wherein the active method includes selectively probing the LDNS using one or more pings or queries to obtain the second RTT estimates.

18. The method of claim 17, wherein the first RTT value and the second RTT value represent third RTT estimates obtained using the message-reflection method.

19. The method of claim 11, wherein the first data center includes a first Application Delivery Controller (ADC); wherein the second data center includes a second ADC; wherein the first ADC communicates with a first reflector Domain Name System (DNS) server and a first collector DNS server; wherein the second ADC communicates with a second reflector DNS server and a second collector DNS server; and wherein the first request message includes a DNS request message, wherein the message-reflection method includes determining the first RTT value by:
   receiving, at the first reflector DNS server at the first data center, the first request message;
   augmenting the first request message with a first time stamp and an Internet Protocol (IP) address of the first collector DNS server, resulting in an adjusted first message;
   sending the adjusted first message to the LDNS, whereby the adjusted first message represents a first reflected request message;
   receiving at the first collector DNS server a first return message from the LDNS in response to receiving the first reflected request message;
   comparing the first time stamp with a time at which the first collector DNS server receives the first return message; and
   estimating the first RTT based on the comparing.

20. An apparatus comprising:
   one or more processors; and
   logic encoded in one or more tangible media for execution by the one or more processors and when executed operable for:
      estimating a first Round Trip Time (RTT) between a first data center and a Local Domain Name Server (LDNS) and a second Round Trip Time (RTT) between a second data center and the LDNS using a message-reflection method, resulting in a first RTT value and a second RTT value, respectively;
      storing the first RTT value and the second RTT value in a database that is accessible to the first data center and the second data center, resulting in stored latency information;
      receiving a first request message, at the LDNS, from a client that is remotely located from the first data center and the second data center;
      receiving a first request message from the LDNS at the first data center or the second data center;
      determining, based on the stored latency information, whether the first RTT or the second RTT is smaller; and
      selecting the first data center or the second data center to process the first request message based on whether or not the first RTT or the second RTT is smaller, respectively.

* * * * *